United States Patent
Miyatake et al.

(10) Patent No.: US 6,822,045 B2
(45) Date of Patent: Nov. 23, 2004

(54) RUBBER-MODIFIED RESIN AND THERMOPLASTIC RESIN COMPOSITION CONTAINING THE SAME

(75) Inventors: Nobuo Miyatake, Takasago (JP); Akira Takaki, Takasago (JP)

(73) Assignee: Kaneka Corporation, Osaka (JP)

( * ) Notice: Subject to any disclaimer, the term of this patent is extended or adjusted under 35 U.S.C. 154(b) by 30 days.

(21) Appl. No.: 10/168,741

(22) PCT Filed: Nov. 30, 2001

(86) PCT No.: PCT/JP01/10465

§ 371 (c)(1),
(2), (4) Date: Jun. 18, 2002

(87) PCT Pub. No.: WO02/46257

PCT Pub. Date: Jun. 13, 2002

(65) Prior Publication Data

US 2003/0092819 A1 May 15, 2003

(30) Foreign Application Priority Data

Dec. 5, 2000  (JP) ........................... 2000-370273

(51) Int. Cl.$^7$ ..................... C08F 291/00; C08F 291/02; C08L 51/00; C08L 51/04; C08L 101/00
(52) U.S. Cl. ............... 525/64; 525/69; 525/70; 525/71; 525/100; 525/185; 525/193; 525/254; 525/326.5
(58) Field of Search ................ 525/64, 69, 70, 525/71, 185, 193, 326.5, 100, 254; 523/207, 212, 206, 209; 524/458

(56) References Cited

U.S. PATENT DOCUMENTS

| 4,725,648 A |   | 2/1988  | Fujimoto et al.          |
|-------------|---|---------|--------------------------|
| 5,405,908 A |   | 4/1995  | Takahashi et al.         |
| 5,506,287 A |   | 4/1996  | Takahashi et al.         |
| 6,153,694 A | * | 11/2000 | Miyatake et al. ...... 525/63 |

FOREIGN PATENT DOCUMENTS

| GB |       1103243       | 2/1968 |               |
|----|---------------------|--------|---------------|
| JP |       9217006       | 8/1997 |               |
| JP |     2001-261755     | 9/2001 |               |
| WO | WO 9906457 A1 *     | 2/1999 | ...... C08F/291/02 |

* cited by examiner

Primary Examiner—Kelechi C. Egwim
(74) Attorney, Agent, or Firm—Brinks Hofer Gilson & Lione

(57) ABSTRACT

A rubber-modified resin obtained by conducting polymerization of a vinyl monomer in the presence of a mixed rubber latex of a silicone rubber latex (A) and an acrylic rubber latex (B), during which polymer particles are coagglomerated to enhance the particle size. The rubber-modified resin is useful as impact modifier and provides thermoplastic resin compositions having an excellent impact resistance by the incorporation thereof into thermoplastic resins.

8 Claims, No Drawings

RUBBER-MODIFIED RESIN AND THERMOPLASTIC RESIN COMPOSITION CONTAINING THE SAME

RELATED APPLICATIONS

This application is a nationalization of PCT application PCT/JP01/10465 filed Nov. 30, 2001. This application claims priority from the PCT application and Japan Application Ser. No. 2000-370273 filed Dec. 5, 2000.

TECHNICAL FIELD

The present invention relates to a rubber-modified resin useful as an impact modifier for thermoplastic resins, and a thermoplastic resin composition containing the same. More particularly, the present invention relates to a rubber-modified resin wherein a resin is modified with two rubbers of a silicone rubber and an acrylic rubber, and a thermoplastic resin composition having an excellent impact resistance.

BACKGROUND ART

It has been popularly practiced to improve the impact resistance of thermoplastic resins by incorporating a rubber-modified resin containing a rubber component into the thermoplastic resins.

It has been considered advantageous in exhibiting impact resistance to use a rubber component having a glass transition temperature (Tg) as low as possible. In practice, a resin composition incorporated with a resin modified with a polybutadiene-based rubber having a low Tg of about −80° C., e.g., acrylonitrile/butadiene/styrene copolymer (ABS resin), has a higher impact resistance than a resin composition incorporated with a resin modified with a polybutyl acrylate rubber having a Tg of about −50° C.

In respect of low Tg of rubbers, a polyorganosiloxane rubber (hereinafter also referred to as "silicone rubber") can be expected to impart a higher impact resistance as compared with rubber-modified resins containing a polybutadiene-based rubber component if rubber-modified resins containing a silicone rubber can be utilized as impact modifier, since for example the Tg of polydimethylsiloxane rubber is about −120° C.

Use of silicone rubber is also advantageous from the viewpoint of weatherability as being superior to polybutyl acryalate rubber and polybutadiene-based rubber.

From such a point of view, recently, it has been variously investigated to use resins modified with silicone rubber or composite rubbers containing silicone rubber as an impact modifier for thermoplastic resins. For example, JP-A-4-100812 discloses using a graft copolymer prepared by graft-polymerizing a vinyl monomer onto a composite rubber wherein a silicone rubber component and a polyalkyl (meth)acrylate component are unseparably entangled with each other. Also, JP-A-11-100481 discloses using a graft copolymer prepared by co-agglomerating silicone rubber particles and acrylic rubber particles to give a composite rubber of enhanced particle size and graft-polymerizing a vinyl monomer onto the composite rubber.

The impact resistance of thermoplastic resins is further improved by incorporation of, as an impact modifier, these graft copolymers prepared using the composite rubbers as mentioned above in compared with single use of conventional rubbers such as polybutadiene-based rubber and acrylic rubber. However, the degree of improvement is not so large as one expects.

It is an object of the present invention to provide an impact modifier having a remarkably improved effect of imparting impact resistance.

A further object of the present invention is to provide a thermoplastic resin composition having an improved impact resistance.

DISCLOSURE OF INVENTION

The present inventors have found that a rubber-modified resin having a remarkably improved impact resistance-imparting effect can be prepared by polymerizing a vinyl monomer in the presence of a mixed rubber latex of a silicone rubber latex and an acrylic rubber latex and, during the polymerization, coagglomerating polymer particles present in the mixed latex to enhance the particle size.

Thus, the present invention provides a rubber-modified resin obtained by polymerizing a vinyl monomer in the presence of (A) a silicone rubber latex and (B) an acrylic rubber latex and, during the polymerization, coagglomerating polymer particles to enhance the particle size.

The rubber-modified resin of the present invention contains a silicone rubber and an acrylic rubber as the rubber component. The silicone rubber used in the present invention comprehends a polyorganosiloxane and a modified polyorganosiloxane wherein a polyorganosiloxane is partly replaced with an organic polymer having no polyorganosiloxane segment. It is preferable that the amount of silicone (polyorganosiloxane) in the total rubber component of the modified-rubber resin is from 1 to 90% by weight based on 100% by weight of the total of the silicone rubber and the acrylic rubber. Also, it is preferable that the amount of the total rubber latex is from 40 to 98 parts by weight (solid basis) and the amount of the vinyl monomer is from 2 to 60 parts by weight, respectively, based on 100 parts by weight of the total of the whole rubber component and the vinyl monomer. Preferably the particle size enhancement by coagglomeration is conducted by adding an electrolyte to the polymerization system on or before the polymerization conversion of the vinyl monomer reaches 90% by weight, especially when the polymerization conversion reaches 10 to 70% by weight.

The rubber-modified resin of the present invention can be incorporated into various thermoplastic resins, whereby the impact resistance of the thermoplastic resins is remarkably improved.

Thus, the present invention also provides a thermoplastic resin composition comprising a thermoplastic resin and 0.1 to 150 parts by weight of the above-mentioned rubber-modified resin per 100 parts by weight of the thermoplastic resin.

BEST MODE FOR CARRYING OUT THE INVENTION

The rubber-modified resins of the present invention are those prepared by polymerizing a vinyl monomer in the presence of a mixed rubber latex of (A) a silicone rubber latex and (B) an acrylic rubber latex and, during the polymerization, coagglomerating polymer particles in the latex to enhance the particle size. That is to say, the rubber-modified resins comprise particles formed by particle size-enhancing co-agglomeration, which is conducted in the course of the graft polymerization, of graft copolymer particles wherein a vinyl monomer is graft-polymerized onto a silicone rubber (or particles wherein the silicone rubber and a polymer of the vinyl monomer are physically coexist if the silicone rubber has no grafting site) and graft copolymer particles wherein the vinyl monomer is graft-polymerized onto an acrylic rubber (or particles wherein the acrylic rubber and the vinyl polymer are physically coexist if the acrylic rubber has no grafting site).

The rubber-modified resins of the present invention have the advantage of being superior in impact resistance-imparting effect as compared with a rubber-modified resin prepared in the same manner as the present invention but without conducting the particle size enhancing coagglomeration during the polymerization of vinyl monomer, and a rubber-modified resin prepared in such a manner as coagglomerating a latex of a mixed rubber (silicone rubber and acrylic rubber) prior to the polymerization of vinyl monomer, namely a graft copolymer prepared by graft-polymerizing a vinyl monomer onto a composite rubber of silicone rubber and acrylic rubber.

The term "silicone rubber" as used herein comprehends a polyorganosiloxane having rubber elasticity, namely a conventional silicone rubber, a modified silicone rubber composed of a silicone rubber and an organic polymer having no silicone (polyorganosiloxane) segment (e.g., butyl acrylate polymer rubber, butadiene polymer rubber, styrene polymer, styrene-butyl acrylate copolymer, styrene-acrylonitrile copolymer or methyl methacrylate polymer), and the like. The modified silicone rubber includes a modified silicone rubber wherein a silicone rubber and an organic polymer having no silicone segment are chemically bonded, a modified silicone rubber wherein a silicone rubber and an organic polymer having no silicone segment are entangled, and a modified silicone rubber wherein a silicone rubber and an organic polymer having no silicone segment merely coexist without entangling each other.

The term "acrylic rubber" as used herein means a rubber (elastomer) containing at least 50% by weight, especially at least 60% by weight, of units of a (meth)acrylic monomer.

From the viewpoint of easiness in particle size enhancement by coagglomeration operation mentioned after, it is preferable that the silicone rubber particles included in the silicone rubber latex (A) have an average particle size of 10 to 200 nm, especially 20 to 150 nm.

The content of solvent-insoluble matter in the silicone rubber particles, namely the gel content of the silicone rubber, denotes a weight percentage of a toluene-insoluble matter measured by immersing a sample in toluene at room temperature for 24 hours and centrifuging at 12,000 rpm for 1 hour. It is also preferable from the viewpoint of exhibiting impact strength that the content of solvent-insoluble matter in the silicone rubber particles is from 0 to 100% by weight, especially 40 to 100% by weight.

The content of silicone (polyorganosiloxane) component included in the silicone rubber particles is not particularly limited, but is preferably at least 50% by weight, especially at least 60% by weight, from the viewpoint of exhibiting impact resistance. The maximum value thereof is 100% by weight.

Examples of the silicone rubber are, for instance, dimethylsiloxane rubber, a modified silicone rubber composed of butyl acrylate rubber and dimethylsiloxane rubber which are chemically bonded, a modified silicone rubber composed of butyl acrylate rubber and dimethylsiloxane rubber which are entangled with each other, a modified silicone rubber composed of butyl acrylate rubber and dimethylsiloxane rubber which merely coexist without being entangled with each other, a modified silicone rubber composed of styrene-butyl acrylate copolymer and dimethylsiloxane rubber which are chemically bonded, a modified silicone rubber composed of styrene-butyl acrylate copolymer and dimethylsiloxane rubber which are entangled with each other, a modified silicone rubber composed of styrene-butyl acrylate copolymer and dimethylsiloxane rubber which merely coexist without being entangled with each other, and the like.

The silicone rubber latex (A) used in the present invention usually has a solid concentration of 10 to 50% by weight (measured after drying at 120° C. for 1 hour). Silicone rubber latex (A) having a solid concentration of 20 to 40% by weight is preferred from the viewpoint of easiness in controlling the particle size by the particle size enhancement operation mentioned after.

The silicone rubber latex (A) is prepared, for instance, by emulsion polymerization using, as a main component, a silicone rubber-forming component comprising an organosiloxane (a) and optionally a crosslinking agent (b), a graftlinking agent (c) and other organosilane (d) than those used as the crosslinking agent and the graftlinking agent.

The organosiloxane (a) is a component which constitutes the backbone of the silicone rubber chains, and linear and cyclic organosiloxanes can be used. Cyclic organosiloxanes are preferred from the viewpoints of applicability to emulsion polymerization system and economy. Examples of the cyclic organosiloxane are, for instance, hexamethylcyclotrisiloxane (D3), octamethylcyclotetrasiloxane (D4), decamethylcyclopentasiloxane (D5), dedecamethylcyclohexasiloxane (D6), tetradecamethylcycloheptasiloxane (D7), hexadecamethyl-cyclooctasiloxane (D8), and the like. The organosiloxanes may be used alone or in admixture thereof. In particular, D4, a mixture of D3 to D7 and a mixture of D3 to D8 are preferably used from an economical point of view.

The crosslinking agent (b) is optionally used for the purpose of introducing a crosslinked structure into the silicone rubber by copolymerization with the organosiloxane (a), thereby imparting a rubber elasticity to the silicone rubber. Examples thereof are, for instance, tetrafunctional and trifunctional alkoxysilane compounds such as tetramethoxysilane, tetraethoxysilane, triethoxymethylsilane, triethoxyethylsilane, butyltrimethoxysilane, butyltriethoxysilane, propyltrimethoxysilane and octyltrimethoxysilane, and other tetrafunctional and trifunctional silane compounds. These may be used alone or in admixture thereof. Of these, alkoxysilane compounds having a $C_2$ to $C_8$ monovalent hydrocarbon group are preferred from the viewpoints of imparting an affinity with acrylic rubber component to the obtained silicone rubber to thereby controlling the impact resistance-imparting effect.

The graftlinking agent (c) includes reactive silane compounds having a polymerizable unsaturated bond or a mercapto group in their molecules. It is optionally used for the purpose of introducing polymerizable unsaturated bonds or mercapto group into the side chains or molecular chain ends of copolymers by the copolymerization with the organosiloxane and optionally the crosslinking agent and the like. The polymerizable unsaturated bond or mercapto group serves as an active site for grafting of vinyl monomers mentioned after. The polymerizable unsaturated bond or mercapto group also serves as a crosslinking point which forms crosslinkages by a radical reaction between them through a radical polymerization initiator. Even in the case that crosslinking is conducted by radical reaction, a part of the unsaturated bonds or mercapto groups remain as a grafting point and, therefore, grafting is possible.

Examples of the reactive silane compound having a polymerizable unsaturated bond in its molecule are, for instance, a silane compound of the formula (1):

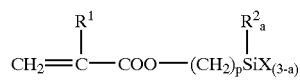
(1)

wherein $R^1$ is hydrogen atom or methyl group, $R^2$ is a monovalent hydrocarbon group having 1 to 6 carbon atoms, X is an alkoxyl group having 1 to 6 carbon atoms, a is 0, 1 or 2, and p is an integer of 1 to 6, a silane compound of the formula (2):

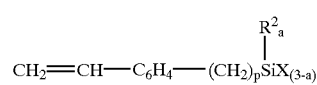
(2)

wherein $R^2$, X, a and p are as defined above, a silane compound of the formula (3):

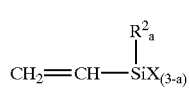
(3)

wherein $R^2$, X and a are as defined above, a silane compound of the formula (4):

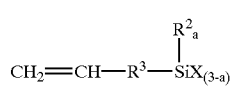
(4)

wherein $R^2$, X and a are as defined above, and $R^3$ is a bivalent hydrocarbon group having 1 to 6 carbon atoms, and the like.

Examples of the group $R^2$ in the formulas (1) to (4) are, for instance, an alkyl group such as methyl group, ethyl group or propyl group, phenyl group, and the like. Examples of the group X are, for instance, an alkoxyl group having 1 to 6 carbon atoms such as methoxy group, ethoxy group, propoxy group or butoxy group, and the like. Examples of the group $R^3$ in the formula (4) are, for instance, methylene group, ethylene group, trimethylene group, tetramethylene group, and the like.

Examples of the reactive silane compound (1) are, for instance, β-methacryloyloxyethyldimethoxymethylsilane, γ-methacryloyloxy-propyldimethoxymethylsilane, γ-methacryloyloxypropyltrimethoxysilane, γ-methacryloyloxypropyldimethylmethoxysilane, γ-methacryloyloxypropyltriethoxysilane, γ-methacryloyloxypropyldiethoxymethylsilane, γ-methacryloyloxypropyltripropoxysilane, γ-methacryloyloxypropyldipropoxymethylsilane, γ-acryloyloxypropyldimethoxymethylsilane γ-acryloyloxypropyltrimethoxysilane, and the like. Examples of the reactive silane compound (2) are, for instance, p-vinylphenyldimethoxymethylsilane, p-vinylphenyltrimethoxysilane, p-vinylphenyltriethoxysilane, p-vinylphenyldiethoxymethylsilane, and the like. Examples of the reactive silane compound (3) are, for instance, vinylmethyldimethoxysilane, vinylmethyldiethoxysilane, vinyltrimethoxysilane, vinyltriethoxysilane, and the like.

Examples of the reactive silane compound (4) are, for instance, allylmethyldimethoxysilane, allylmethyldiethoxysilane, allyltrimethoxysilane, allyltriethoxysilane, and the like. Of these, silane compounds of the formulas (1) and (3) are preferably used from the viewpoints of economy and reactivity.

A typical example of the reactive silane compound having mercapto group in its molecule is a silane compound of the formula (5):

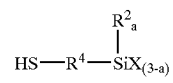
(5)

wherein $R^2$, X and a are as defined above, and $R^4$ is a bivalent organic group such as an alkylene group having 1 to 18 carbon atoms. Examples of the alkylene group are, for instance, methylene group, ethylene group, trimethylene group, tetramethylene group and the like.

Examples of the reactive silane compound (5) are, for instance, mercaptopropyltrimethoxysilane, mercaptopropyldimethoxymethylsilane, and the like.

Reactive silane compounds of trialkoxysilane type serve both as a graftlinking agent and as a crosslinking agent.

The organosilanes (d) other than the above-mentioned crosslinking agent (b) and graftlinking agent (c) serve to impart an affinity with an acrylic rubber to the obtained silicone rubbers. They include, for instance, organosilane compounds having a structural unit of the formula (6):

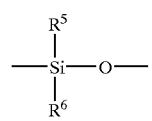
(6)

wherein $R^5$ and $R^6$ are a monovalent hydrocarbon group having 1 to 10 carbon atoms, e.g., methyl group, ethyl group, propyl group or phenyl group, and $R^5$ and $R^6$ may be the same or different unless they are simultaneously methyl group. Examples of the organosilane having the structural unit (6) are, for instance, methylbutyldimethoxysilane, dibutyldimethoxysilane, methyloctyldimethoxysilane, phenylmethyldimethoxysilane, diphenyldimethoxysilane and other dialkoxysilane compounds. These may be used alone or in admixture thereof. If the organosiloxane (a), crosslinking agent (b) or graftlinking agent (c) has the structural unit of the formula (6), there is no need to use the other organosilane (d).

With respect to the proportions of the organosiloxane (a), crosslinking agent (b), graftlinking agent (c) and other organosilane (d) in the silicone rubber-forming component, it is preferable that the proportion of the organosiloxane (a) is from 59.9 to 99.9% by weight, especially 70 to 99% by weight, the proportion of the crosslinking agent (b) is from 0 to 40% by weight, especially 0.5 to 20% by weight, the proportion of the graftlinking agent (c) is from 0 to 40% by weight, especially 0.5 to 20% by weight, and the proportion of the other organosilane (d) is from 0 to 40% by weight, especially 0 to 29% by weight (the total of (a) to (d) is 100% by weight). The crosslinking agent and the graftlinking agent are optional components, but it is preferable that the amounts of the crosslinking agent and the graftlinking agent are not simultaneously 0% by weight and either of them is used in an amount of at least 0.1% by weight. If the proportion of the organosiloxane is too small, the product lacks properties as a rubber, so the impact resistance-imparting effect is decreased. If the proportion of organosiloxane is too large, the amounts of the crosslinking agent, graftlinking agent and other organosilane become to small, so the effects produced by the use thereof tend to be exhibit with difficulty. Also, if the proportion of the crosslinking agent or graftlinking agent is too small, the impact resistance-imparting effect is small, and if the proportion is too large, the product lacks rubber-like properties, so the impact resistance-imparting effect also tends to be lowered. The other organosilane (d) is an optional component. An affinity with acrylic rubber component is provided by the use thereof, whereby the impact resistance-imparting effect can be adjusted. However, it is preferable to use the other organosilane (d) under consideration of balance between the cost and the physical properties, since the use thereof leads to increase in cost.

The silicone rubber latex (A) can be prepared, for example, by a method wherein the silicone rubber-forming component comprising the organosiloxane and optionally the crosslinking agent and the graftlinking agent and further optionally the other organosilane is emulsified and dispersed into water by mechanical shearing in the presence of an emulsifier and is polymerized under acidic condition. In case of preparing modified silicone rubbers, the silicone rubber-forming component is used in combination with a vinyl monomer component. In case that emulsified droplets having a size of not less than several micrometers have been formed by mechanical shearing, it is possible to control the average particle size of the silicone rubber particles obtained after the polymerization within the range of 20 to 400 nm depending on the amount of an emulsifier used. It is also possible to obtain the particles whose variation coefficient (100× standard deviation/average particle size) (%) in the particle size distribution thereof is not more than 70%.

Also, when it is desired to prepare a silicone rubber having an average particle size of not more than 100 nm and a narrow particle size distribution, it is preferable to carry out the polymerization in multistages. For example, 1 to 20% by weight of an emulsion comprising emulsified droplets of not less than several micrometers obtained by emulsifying the silicone rubber-forming component, water and an emulsifier by means of mechanical shearing thereof is previously subjected to emulsion polymerization under an acidic condition, and the remaining emulsion is then added and polymerized in the presence of the produced silicone rubber as seeds. In case of preparing the silicone rubber in such a manner, it is possible to control the average particle size within the range of 20 to 100 nm depending on the amount of an emulsifier used, and also to control the variation coefficient in the particle size distribution to not more than 60%. More preferable is a multistage polymerization method wherein a vinyl (co)polymer prepared by homo- or copolymerizing a vinyl monomer, e.g., a vinyl monomer as used in the graft polymerization mentioned after (such as styrene, butyl acrylate or methyl acrylate) in a usual emulsion polymerization manner is used as seeds instead of the silicone rubber seeds in the above multistage polymerization, and a multistage polymerization is carried out in the same manner as above. According to such a method, it is possible to control the average particle size of the obtained silicone rubber (modified silicone rubber) within the range of 10 to 100 nm and the variation coefficient in the particle size distribution to not more than 50% depending on the amount of an emulsifier used.

The emulsion droplets of not less than several micrometers can be prepared by using a high speed agitating machine such as a homogenizer.

In these methods are used emulsifiers which do not lose an ability as emulsifier even under an acidic condition. Examples of such emulsifiers are, for instance, alkylbenzenesulfonic acid, sodium alkylbenzenesulfonate, alkylsulfonic acid, sodium alkylsulfonate, sodium (di)alkyl sulfosuccinate, sodium polyoxyethylene nonylphenyl ether sulfonate, sodium alkylsulfate, and the like. These may be used alone or in admixture thereof.

Preferably the acidic condition is adjusted to a pH of 1 to 3 by adding an inorganic acid such as sulfuric acid or hydrochloric acid or an organic acid such as alkylbenzenesulfonic acid, alkylsulfonic acid or trifluoroacetic acid to the polymerization system, since the rate of polymerization is adequate.

The polymerization temperature to form the silicone rubber is preferably from 60 to 120° C., more preferably from 70 to 100° C., since the rate of polymerization is adequate.

The silicone rubber latex is obtained in such a manner, but under an acidic condition the Si—O—Si bonds which constitute the backbone of silicone rubber are in an equilibrium state between severance and formation, and this equilibrium varies depending on the temperature. Accordingly, for the purpose of stabilization of silicone rubber chains, it is preferable to neutralize the latex by addition of an aqueous solution of an alkali such as sodium hydroxide, potassium hydroxide or sodium carbonate. The equilibrium shifts to the formation side as the temperature lowers and, therefore, a silicone rubber having a high molecular weight or a high degree of crosslinking is easy to be produced. Thus, when it is desired to obtain a silicone rubber having a high molecular weight or a high degree of crosslinking, it is preferable that after conducting the polymerization for the production of silicone rubbers at a temperature of 60° C. or higher, the reaction mixture is cooled to room temperature or in the vicinity thereof, maintained at that temperature for about 5 to about 100 hours and then neutralized.

Acrylic rubber latex (B) used in the present invention is, as mentioned above, a latex of an acrylic rubber containing 50 to 100% by weight of units of a (meth)acrylic monomer. Any acrylic rubbers can be used without particular restriction so long as they have properties as a rubber. Examples thereof are, for instance, a latex of poly(butyl acrylate) rubber, a latex of poly(2-ethylhexyl acrylate) rubber, a latex of butyl acrylate-2-ethyl hexyl acrylate copolymer rubber, a latex of a composite rubber of poly(butyl acrylate) and poly(2-ethylhexyl acrylate), and the like.

The acrylic rubber latex (B) usually has a solid concentration of 10 to 50% by weight (measured after drying at 120° C. for 1 hour). Acrylic rubber latex (B) having a solid concentration of 20 to 40% by weight is preferred from the viewpoint of easiness in controlling the particle size by the particle size enhancement operation mentioned after.

From the viewpoint of easiness in particle size enhancement by coagglomeration operation mentioned after, it is preferable that the rubber particles included in the acrylic rubber latex (B) have an average particle size of 10 to 200 nm, especially 20 to 150 nm.

From the viewpoint of exhibiting impact strength, it is preferable that the content of solvent-insoluble matter in the rubber particles of the acrylic rubber latex (B) (gel content: weight fraction of a toluene-insoluble matter measured by immersing a sample in toluene at room temperature for 24 hours and centrifuging at 12,000 rpm for 1 hour) is not less than 70% by weight, especially not less than 80% by weight. The maximum gel fraction is 100% by weight.

Examples of the acrylic rubber are, for instance, polybutyl acrylate rubber, butyl acrylate-2-ethylhexyl (meth)acrylate copolymer rubber, a composite rubber of polybutyl acrylate and poly2-ethylhexyl (meth)acrylate, butyl acrylate-butadiene copolymer rubber, butyl acrylate-styrene copolymer rubber, and the like. The acrylic rubbers may be used alone or in admixture thereof. The term "copolymer" as used herein comprehends random copolymers, block copolymers, graft copolymers and combinations thereof.

The acrylic rubber latex can be obtained by polymerizing a monomer mixture of an alkyl (meth)acrylate monomer, a polyfunctional monomer containing at least two polymerizable unsaturated bonds in its molecule, other copolymerizable monomers and the like in the presence of a radical polymerization initiator and optionally a chain transfer agent according to a conventional emulsion polymerization method, for example, by methods as described in JP-A-50-88169 and JP-A-61-141746.

The alkyl (meth)acrylate monomer is a component which constitutes the main backbone of the acrylic rubber. Examples thereof are, for instance, an alkyl acrylate having a $C_1$ to $C_{12}$ alkyl group such as methyl acrylate, ethyl acrylate, propyl acrylate, butyl acrylate or 2-ethylhexyl acrylate, an alkyl methacrylate having a $C_4$ to $C_{12}$ alkyl group such as 2-ethylhexyl methacrylate or lauryl methacrylate, and the like. These may be used alone or in admixture thereof. Of these, a monomer mixture containing 40 to 100% by weight, especially 60 to 100% by weight, of butyl acrylate is preferred from the viewpoints of low glass transition temperature of the obtained polymers and economy, in which the residual comonomer is for instance methyl acrylate, ethyl acrylate, 2-ethylhexyl acrylate or the like.

The polyfunctional monomer containing at least two polymerizable unsaturated bonds in its molecule is a component used for introducing a crosslinked structure to the acrylic rubber particles to form a network structure, thereby exhibiting a rubber elasticity, and for providing an active site for grafting of vinyl monomers mentioned after. Examples of the polyfunctional monomer are, for instance, diallyl phthalate, triallyl cyanurate, triallyl isocyanurate, allyl methacrylate, ethyleneglycol dimethacrylate, divinyl benzene, other known allyl, di(meth)acrylate and divinyl compounds, and the like. These may be used alone or in admixture thereof. Of these, allyl methacrylate, triallyl cyanurate, triallyl isocyanurate and diallyl phthalatae are preferred from the viewpoints of crosslinking efficiency and grafting efficiency.

The other copolymerizable monomer may be optionally used for the purpose of adjusting the refractive index of the obtained acrylic rubbers or the affinity with silicone rubbers. Examples thereof are, for instance, methacrylic acid, a methacrylic ester monomer such as methyl methacrylate, ethyl methacrylate, glycidyl methacrylate, hydroxyethyl methacrylate or benzyl methacrylate, an aromatic vinyl monomer such as styrene or α-methylstyrene, a vinyl cyanide monomer such as acrylonitrile or methacrylonitrile, a silicon-containing vinyl monomer such as γ-methacryloyloxypropyldimethoxymethylsilane, γ-methacryloyloxypropyltrimethoxysilane or trimethylvinylsilane, and the like. These may be used alone or in admixture thereof.

Preferable proportions of the monomers used in the production of acrylic rubber latex are from 66.5 to 99.9% by weight, especially 85 to 99.9% by weight, of the alkyl (meth)acrylate monomer, 0.1 to 10% by weight, especially 0.1 to 5% by weight of the polyfunctional monomer containing two or more polymerizable unsaturated bonds in its molecule, and 0 to 23.4% by weight, especially 0 to 14.9% by weight, of the other copolymerizable monomer, the total thereof being 100% by weight. If the proportion of the alkyl (meth)acrylate monomer is too small, the products lack properties as a rubber, so the impact resistance-imparting effect is lowered. If the proportion of the alkyl (meth) acrylate is too large, the proportion of the polyfunctional monomer becomes too small, so the effects to be produced thereby tend to be insufficient. Also, if the proportion of the polyfunctional monomer is too small, the crosslinking density is low, so the impact resistance-imparting effect tends to be lowered, and if the proportion is too large, the crosslinking density becomes too high, so the impact resistance-imparting effect also tends to be lowered. The other copolymerizable monomer is a component used for adjusting the refractive index or the impact resistance and, when it is desired to obtain the effects to be produced by the use thereof, the amount thereof is preferably not less than 0.1% by weight.

As the radical polymerization initiator used in the emulsion polymerization for the preparation of the acrylic rubber latex and the chain transfer agent optionally used therein, those used in usual radical polymerization can be used without particular restriction.

Examples of the radical polymerization initiator are an organic peroxide such as cumene hydroperoxide, tert-butyl hydroperoxide, benzoyl peroxide, tert-butylperoxy isopropylcarbonate, di-tert-butyl peroxide, tert-butylperoxy laurate, lauroyl peroxide, succinic acid peroxide, cyclohexanone peroxide or acetylacetone peroxide; an inorganic peroxide such as potassium persulfate or ammonium persulfate; an azo compound such as 2,2'-azobisisobutylonitrile or 2,2'-azobis-2,4-dimethylvaleronitrile; and the like. Of these, organic peroxides and inorganic peroxides are preferably used from the viewpoint of a high reactivity.

In case of using organic peroxides or inorganic peroxides, they may be used in combination with a reducing agent, e.g., a mixture of ferrous sulfate/glucose/sodium pyrophosphate, a mixture of ferrous sulfate/dextrose/sodium pyrophosphate, or a mixture of ferrous sulfate/sodium formaldehyde sulfoxylate/ethylenediamineacetate. The use of a reducing agent is particularly preferable, since the polymerization temperature can be lowered.

The radical polymerization initiator is used usually in an amount of 0.005 to 10 parts by weight, preferably 0.01 to 5 parts by weight, more preferably 0.02 to 2 parts by weight, per 100 parts by weight of a monomer mixture used. If the amount of the initiator is too small, the rate of polymerization is low, so the production efficiency tends to be lowered, and if the amount is too large, the molecular weight of the obtained polymers is lowered, so the impact resistance tends to be lowered.

Examples of the chain transfer agent are, for instance, t-dodecylmercaptan, n-octylmercaptane, n-tetradecylmercaptan, n-hexylmercaptan and the like.

The chain transfer agent is an optional component. From the viewpoint of exhibiting the impact resistance-imparting effect, it is preferable that the amount thereof is from 0.001 to 5 parts by weight per 100 parts by weight of the monomer mixture.

Examples of the emulsifier used in emulsion polymerization for the production of acrylic rubbers are, besides emulsifiers which can be used in the production of silicone rubber latex (A), fatty acid metal salts such as potassium oleate, sodium oleate, potassium rhodinate, sodium rhodinate, potassium palmitate, sodium palmitate and potassium stearate. These may be used alone or in admixture thereof.

The silicone rubber latex (A) and the acrylic rubber latex (B) are used preferably in such a ratio that the amount of silicone (polyorganosiloxane) is from 1 to 90% by weight, especially from 1 to 50% by weight, more especially from 1 to 20% by weight, based on the whole rubber component (silicone rubber plus acrylic rubber). An effect of imparting a high impact resistance to thermoplastic resins is obtained within this range. If the amount of the silicone included in the whole rubber component is too small or too large, improvement in impact resistance of thermoplastic resins tends to become insufficient.

In case that the amount of silicone is more than 50% by weight, it is preferable from the viewpoint of exhibiting impact resistance that the active sites for grafting are present in the silicone rubber, in other words, graft copolymers are produced by polymerization of vinyl monomers mentioned after. It is also preferable from the viewpoint of impact resistance that the acrylic rubber has active sites for grafting regardless of the amount of silicone.

From the viewpoint of easiness in particle size enhancement by coagglomeration, it is preferable that the solid concentration of the whole rubber latex (mixture of silicone rubber latex and acrylic rubber latex) is from 10 to 50% by weight, especially from 20 to 40% by weight.

The rubber-modified resin of the present invention is obtained by polymerizing a vinyl monomer in the presence of the mixed rubber latex and, during the polymerization, coagglomerating the polymer particles in the latex to enhance the particle size.

The rubber-modified resin comprises, as mentioned above, resin particles containing particles formed by particle size-enhancing co-agglomeration of graft copolymer particles wherein a vinyl monomer is graft-polymerized onto silicone rubber particles of silicone rubber latex (A) (or particles wherein the silicone rubber and a vinyl polymer are physically coexist if the silicone rubber particles have no grafting site) and graft copolymer particles wherein the vinyl monomer is graft-polymerized onto acrylic rubber particles (or particles wherein the acrylic rubber and the vinyl polymer are physically coexist if the acrylic rubber particles have no grafting site). It is preferable that the average particle size of the resin particles is not less than 100 nm, especially not less than 120 nm, and is not more than 1,000 nm, especially not more than 800 nm. If the average particle size is less than 100 nm or more than 1,000 nm, the impact resistance tends to lower. It is preferable that the content of a solvent-insoluble matter in the rubber-modified resin is not less than 40% by weight, especially not less than 70% by weight, more especially not less than 80% by weight.

The "coagglomeration to enhance particle size" or "particle size enhancement by coagglomeration" denotes simultaneously agglomerating at least two kinds of polymer particles having different chemical compositions in the same system to enhance the particle size.

The particle size-enhancing coagglomeration can be carried out by a conventional method using an electrolyte, for example, by adding, prior to the step of polymerizing a vinyl monomer or during this step, an inorganic salt such as sodium sulfate, an inorganic acid such as hydrochloric acid, an organic acid such as acetic acid, or a latex of a non-crosslinked acid group-containing copolymer obtained by copolymerization of an unsaturated acid monomer and an alkyl (meth)acrylate monomer as disclosed in JP-A-50-25655, JP-A-8-12703 and JP-A-8-12704, to the polymerization system. When it is desired to obtain a rubber-modified resin having an average particle size of 100 to 400 nm, it is preferable to use an inorganic salt, an inorganic acid or an organic acid. An inorganic salt is particularly preferred since an operation for adjusting the pH of the system after the completion of the coagglomeration is omitted. When it is desired to obtain a rubber-modified resin having an average particle size of 300 to 1,000 nm, it is preferable to use the acid group-containing copolymer latex.

An example of the acid group-containing copolymer is, for instance, copolymers of 5 to 25% by weight, especially 5 to 15% by weight, of at least one unsaturated acid such as acrylic acid, methacrylic acid, itaconic acid or crotonic acid, 45 to 95% by weight, especially 65 to 95% by weight, of at least one alkyl (meth)acrylate having a $C_1$ to $C_{12}$ alkyl group (preferably a mixture of 10 to 80% by weight of an alkyl acrylate having a $C_1$ to $C_{12}$ alkyl group and 20 to 90% by weight of an alkyl methacrylate having a $C_1$ to $C_{12}$ alkyl group), and 0 to 30% by weight, especially 0 to 20% by weight, of at least one other vinyl monomer copolymerizable therewith.

In case of using an inorganic salt, an inorganic acid or an organic acid as an electrolyte, preferably the amount thereof is from 0.1 to 5 parts by weight, especially 0.2 to 4 parts by weight, more especially 0.3 to 3 parts by weight, per 100 parts by weight (solid basis) of the mixed rubber latex. If the amount is too small, the coagglomeration tends to be difficult. If the amount is too large, there is a tendency that it is difficult to apply to industrial production since clots are easy to be produced.

In case of using an acid group-containing copolymer latex as an electrolyte, preferably the amount thereof is from 0.1 to 10 parts by weight, especially 0.2 to 5 parts by weight, per 100 parts by weight (solid basis) of the mixed rubber latex. If the amount is too small, the coagglomeration tends to occur with difficulty. If the amount is too large, unfavorable phenomenon such as lowering of impact resistance is easy to occur.

The time of adding an electrolyte such as inorganic salt, inorganic acid, organic acid or acid group-containing copolymer latex to the polymerization system to enhance the particle size is not particularly limited so long as the coagglomeration takes place during the step of polymerizing a vinyl monomer in the presence of rubber particles. From the viewpoint of impact resistance, it is preferable to add the electrolyte to the polymerization system prior to starting the polymerization or until 90% by weight of a vinyl monomer used for the polymerization is polymerized (polymerization conversion 0 to 90% by weight), especially during the period after not less than 10% by weight of the vinyl monomer used for the polymerization is polymerized and until 70% by weight of the vinyl monomer used for the polymerization is polymerized (polymerization conversion 10 to 70% by weight), more especially during the period after not less than 10% by weight of the vinyl monomer used for the polymerization is polymerized and until 50% by weight of the vinyl monomer used for the polymerization is polymerized (polymerization conversion 10 to 50% by weight). After adding the electrolyte, the polymerization is further continued to complete the polymerization. Preferably, the polymerization is carried out until the polymerization conversion of the vinyl monomer reaches at least 95% by weight.

The polymerization temperature is from 30 to 90° C., preferably from 40 to 80° C.

The vinyl monomer polymerized in the mixed rubber latex is a component for raising the affinity of a rubber-modified resin with a thermoplastic resin to thereby uniformly disperse the rubber-modified resin into the thermoplastic resin in the case that the thermoplastic resin is incorporated with the rubber-modified resin and molded.

Examples of the vinyl monomer are, for instance, an aromatic vinyl monomer such as styrene, α-methylstyrene, p-methylstyrene or divinyl benzene, a vinyl cyanide monomer such as acrylonitrile or methacrylonitrile, a halogenated vinyl monomer such as vinyl chloride, vinylidene chloride or vinylidene fluoride, methacrylic acid, a methacrylic ester monomer such as methyl methacrylate, ethyl methacrylate, butyl methacrylate, glycidyl methacrylate, hydroxyethyl methacrylate, ethylene glycol dimethacrylate or 1,3-butylene glycol dimethacrylate, acrylic acid, an acrylic ester monomer such as methyl acrylate, butyl acrylate, glycidyl acrylate or hydroxybutyl acrylate, and the like. The vinyl monomers may be used alone or in admixture thereof. Also, one or at least two vinyl monomers may be added and polymerized in multistages. Of these, from the viewpoints of easiness in particle size enhancement by coagglomeration and impact resistance is preferred a monomer mixture containing 50 to 100% by weight, especially 70 to 100% by weight, of a methacrylic ester monomer and/or an acrylic ester monomer, the rest of which may be the above-mentioned aromatic vinyl monomer, vinyl cyanide monomer, halogenated vinyl monomer and the like.

Preferably, the vinyl monomer is used in an amount of 2 to 60 parts by weight, especially 5 to 40 parts by weight, more especially 8 to 20 parts by weight, while the amount of the whole rubber latex (solid basis) is from 40 to 98 parts by weight, especially 60 to 95 parts by weight, more especially 80 to 92 parts by weight, wherein the total thereof is 100 parts by weight. If the amount of the vinyl monomer is too large, there is a tendency that impact resistance is not sufficiently exhibited, since the content of rubber component becomes too small. If the amount of the vinyl monomer is too small, the handling tends to become difficult since the powdery state of the rubber-modified resin is deteriorated.

The polymerization of the vinyl monomer can be carried out by a conventional emulsion polymerization. As a radical polymerization initiator used therein and a chain transfer agent and an emulsifier which are optionally used therein, there may be used those usable in the production of the acrylic rubber latex. The limitations concerning the amounts of them in the production of the acrylic rubber latex are also applicable to this case.

The rubber-modified resin obtained by the polymerization of the vinyl monomer may be isolated as a powder from the obtained latex or may be used in the form of the latex. The isolation of the polymer may be carried out in a usual manner, for example, by adding a metal salt such as calcium chloride, magnesium chloride or magnesium sulfate, or an inorganic or organic acid such as hydrochloric acid, sulfuric acid, phosphoric acid or acetic acid, to the latex to coagulate the latex, separating, washing with water, dehydrating and drying the polymer. A spray-drying method is also applicable.

The thus obtained rubber-modified resin (in the state of powder or latex) is incorporated into various thermoplastic resins to give thermoplastic resin compositions having an improved impact resistance.

Examples of the thermoplastic resin are, for instance, polyvinyl chloride, chlorinated polyvinyl chloride, polystyrene, styrene-acrylonitrile copolymer, styrene-acrylonitrile-N-phenylmaleimide copolymer, α-methylstyrene-acrylonitrile copolymer, polymethyl methacrylate, methyl methacrylate-styrene copolymer, polycarbonate, polyamide, a polyester such as polyethylene terephthalate, polybutylene terephthalate or 1,4-cyclohexanedimethanol-modified polyethylene terephthalate, butadiene rubber-styrene copolymer (HIPS resin), acrylonitrile-butadiene rubber-styrene copolymer (ABS resin), acrylonitrile-acrylic rubber-styrene copolymer (AAS resin), acrylonitrile-ethylenepropylene rubber-styrene copolymer (AES resin), polyphenylene ether, and the like. These may be used alone or in admixture thereof. Examples of a combination of at least two resins are a mixed resin of 5 to 95% by weight of polycarbonate and 5 to 95% by weight of HIPS resin, ABS resin, AAS resin or AES resin (total thereof 100% by weight), and a mixed resin of 5 to 95% by weight of polycarbonate and 5 to 95% by weight of polyethylene terephthalate or polybutylene terephthalate (total thereof 100% by weight).

It is preferable, from the viewpoint of a balance of physical properties, that the amount of the rubber-modified resin is from 0.1 to 150 parts by weight, especially from 0.5 to 120 parts by weight, per 100 parts by weight of a thermoplastic resin. If the amount is too small, the impact resistance of thermoplastic resins is not sufficiently improved, and if the amount is too large, it is difficult to maintain the properties such as rigidity and surface hardness of the thermoplastic resins.

Mixing of a thermoplastic resin with a solid powder of the rubber-modified resin can be carried out by firstly mixing them through a Henschel mixer, a ribbon mixer or the like and then melt-kneading the mixture through a roll mill, an extruder, a kneader or the like.

The thermoplastic resin compositions of the present invention may contain usual additives, e.g., plasticizer, stabilizer, lubricant, ultraviolet absorber, antioxidant, flame retardant, pigment, glass fiber, filler, polymer processing aid, polymer lubricant and antidropping agent. For example, preferable examples of the flame retardant are a phosphorus compound such as triphenyl phosphate, condensed phosphate or stabilized red phosphorus, a silicone compound such as phenyl group-containing polyorganosiloxane copolymer, and the like. Preferable examples of the polymer processing aid are methacrylate (co)polymers such as methyl methacrylate-butyl acrylate copolymer. Preferable examples of the antidropping agent are fluorocarbon resins such as polytetrafluoroethylene. Preferable amounts of these additives are, from the viewpoint of effect-cost balance, 0.1 to 30 parts by weight, especially 0.2 to 20 parts by weight, more especially 0.5 to 10 parts by weight, per 100 parts by weight of a thermoplastic resin.

The thermoplastic resin composition can also be obtained by mixing a latex of a thermoplastic resin with a latex of the rubber-modified resin and subjecting the mixed latex to coprecipitation of polymer particles.

Molding methods conventionally used for thermoplastic resin compositions, e.g., injection molding, extrusion, blow molding and calendering, are applicable to the thermoplastic resin compositions of the present invention.

The obtained molded articles have excellent impact resistance as compared with those using conventional impact modifiers.

The present invention is more specifically explained by means of examples, but it is to be understood that the present invention is not limited to only these examples. In the following examples and comparative examples, all parts and % excepting variation coefficient are by weight unless otherwise noted.

In the following examples and comparative examples, evaluation was made in the following manners.

[Solid Concentration of Latex and Polymerization Conversion]

A sample of a latex obtained after reaction was dried in a hot air dryer at 120° C. for 1 hour to measure the solid concentration (heating residue). The polymerization conversion of a rubber latex was calculated according to the equation: (amount of solid matter/amount of monomers charged)×100 (%).

[Average Particle Size]

Using as a measuring apparatus MICROTRAC UPA made by LEED & NORTHRUP INSTRUMENTS, the volume average particle size (nm) and the variation coefficient in particle size distribution (standard deviation/volume average particle size)×100 (%) were measured by a light scattering method.

[Content of Solvent-insoluble Matter (Gel Fraction)]

A latex was dried firstly at 50° C. for 75 hours and then at room temperature for 8 hours under reduced pressure to give a test sample. The sample was immersed in toluene for 24 hours and centrifuged at 12,000 r.p.m. for 60 minutes, and the weight percentage of the toluene-insoluble matter in the sample was calculated.

[Izod Impact Strength]

The Izod impact strength was measured at −30° C., 0° C. and 23° C. by using a notched ¼ inch bar or a notched ⅛ inch bar according to ASTM D-256.

[Flame Resistance]

Evaluation was made by UL94 V test.

Preparation Example 1

Preparation of Silicone Rubber Latex (A-1)

A five-necked flask equipped with a stirrer, a reflux condenser, an inlet for introducing nitrogen gas, an inlet for introducing monomers and a thermometer was charged with the following ingredients.

| Ingredients | Amount (part) |
|---|---|
| Pure water | 189 |
| Sodium dodecylbenzenesulfonate (SDBS) | 0.5 |

The temperature was then raised to 70° C. with purging the system with nitrogen gas. Subsequently, after adding 1 part of pure water and 0.02 part of potassium persulfate to the system, a mixed liquid of the following ingredients was added at a time to the system, and was stirred for 1 hour to complete the polymerization, thus giving a latex of ST-BMA copolymer.

| Ingredients | Amount (part) |
|---|---|
| Styrene (ST) | 0.7 |
| Butyl methacrylate (BMA) | 1.3 |

The polymerization conversion was 99%. The obtained latex had a solid content of 1.0%, an average particle size of 10 nm and a variation coefficient of 38%. Also, the content of solvent-insoluble matter in the ST-BMA copolymer was 0%.

Separately, an emulsion of a silicone rubber-forming component was prepared by stirring a mixture of the following ingredients at 10,000 r.p.m. for 5 minutes with a homogenizer.

| Ingredients | Amount (part) |
|---|---|
| Pure water | 70 |
| SDBS | 0.5 |
| Octamethylcyclotetrasiloxane | 94 |
| Vinyltriethoxysilane (VTES) | 2 |
| Tetraethoxysilane (TEOS) | 2 |

Subsequently, the latex containing ST-BMA copolymer was kept at 80° C., and thereto were added 2 parts of dodecylbenzene sulfonic acid and 18 parts of pure water to adjust the system to pH 1.7. The above emulsion of silicone rubber-forming component was added at a time to the latex. The resulting mixture was stirred for 6 hours, and after cooling to 25° C. and allowing to stand for 20 hours, the mixture was adjusted to pH 8.4 with sodium hydroxide to finish the polymerization, thus giving a silicone rubber latex (A-1). The polymerization conversion of the silicone rubber-forming component was 85%. The obtained latex (A-1) had a solid concentration of 23%, an average particle size of 90 nm and a variation coefficient in particle size distribution of 39%. Also, the content of solvent-insoluble matter was 71%. The silicone rubber in the silicone rubber latex was composed of 98% of silicone component and 2% of ST-BMA copolymer component, which were calculated based on the charge and conversion.

Preparation Example 2

Preparation of Silicone Rubber Latex (A-2)

Silicone rubber latex (A-2) was prepared in the same manner as in Preparation Example 1 except that vinyltriethoxysilane (VTES) was replaced with tetraethoxysilane (TEOS) so that the total amount of TEOS was 3 parts. The obtained latex (A-2) had a solid concentration of 23%, an average particle size of 85 nm and a variation coefficient in particle size distribution of 37%. Also, the content of solvent insoluble matter was 81%. The silicone rubber in the silicone rubber latex was composed of 98% of silicone component and 2% of ST-BMA copolymer component, which were calculated based on the charge and conversion.

Preparation Example 3

Preparation of Acrylic Rubber Latex (B-1)

A five-necked flask equipped with a stirrer, a reflux condenser, an inlet for introducing nitrogen gas, an inlet for introducing monomers and a thermometer was charged with the following ingredients at a time.

| Ingredients | Amount (part) |
|---|---|
| Pure water | 200 |
| Sodium oleate | 1.3 |

The temperature was then raised to 70° C. with stirring in a nitrogen stream. After reaching 70° C., a mixture of the following ingredients was added at a time to the system, and 0.05 part of potassium persulfate was further added. The resulting mixture was stirred at 70° C. for 1 hour.

| Ingredients | Amount (part) |
|---|---|
| Butyl acrylate (BA) | 4 |
| Allyl methacrylate (AlMA) | 0.04 |

Subsequently the following mixture was added dropwise over 5 hours, and after the completion of the addition, the mixture was further stirred for 1 hour to complete the polymerization.

| Ingredients | Amount (part) |
| --- | --- |
| BA | 96 |
| AlMA | 0.96 |

The polymerization conversion was 99%. The obtained latex had a solid concentration of 33%, an average particle size of 80 nm and a variation coefficient of 28%. Also, the content of solvent-insoluble matter was 96%.

EXAMPLE 1

A five-necked flask equipped with a stirrer, a reflux condenser, an inlet for introducing nitrogen gas, an inlet for introducing monomers and a thermometer was charged with the following ingredients at a time.

| Ingredients | Amount (part) |
| --- | --- |
| Pure water | 240 |
| Silicone rubber latex (A-1) (solid basis) | 11.9 |
| Acrylic rubber latex (B-1) (solid basis) | 73.1 |

The temperature was then raised to 70° C. with stirring in a nitrogen stream and, after reaching 70° C., 0.03 part of potassium persulfate was added. Subsequently, 15 parts of methyl methacrylate (MMA) was added dropwise over 1 hour, during which 1.2 parts of sodium sulfate was added to enhance the particle size by agglomeration when 3 parts of MMA had been added. After the completion of the addition, stirring was further continued to complete the polymerization, thus giving a latex of rubber-modified resin (I). The polymerization conversion was 99%. The obtained rubber-modified resin particles had an average particle size of 185 nm and a solvent-insoluble matter content of 90%.

The obtained latex was diluted with pure water to 15% in solid concentration, and thereto was added 2 parts of calcium chloride to coagulate the latex. The resulting slurry was once heated to 80° C., and was then cooled, dehydrated and dried to give a powder of rubber-modified resin (I).

Into 100 parts of a vinyl chloride resin having a degree of polymerization of 800 were incorporated 7.0 parts of the rubber-modified resin (I), 3.0 parts of octyl tin mercaptide, 1.0 part of stearyl alcohol, 0.5 part of stearic acid amide, 0.5 part of montanic acid diol ester, 0.5 part of titanium oxide and 1.0 part of a high molecular processing aid commercially available under the trade mark of KANE ACE PA20 made by Kaneka Corporation. The mixture was melt-kneaded by a 50 mm single screw extruder (model VS50-26 made by Tanabe Plastic Kikai Kabushiki Kaisha) to give pellets. The obtained pellets were molded by an injection molding machine (model IS-170G made by Toshiba Machine Co., Ltd.) at a cylinder temperature of 195° C. to give ¼ inch Izod impact test specimens. The results of the Izod impact test are shown in Table 1.

EXAMPLE 2

A powder of rubber-modified resin (II) was prepared in the same manner as in Example 1 except that the silicone rubber latex (A-2) was used instead of the silicone rubber latex (A-1). The polymerization conversion was 99%. The obtained rubber-modified resin particles had an average particle size of 180 nm and a solvent-insoluble matter content of 89%.

The Izod impact test was made in the same manner as in Example 1 except that the rubber-modified resin (II) was used instead of the rubber-modified resin (I). The results are shown in Table 1.

EXAMPLE 3

A powder of rubber-modified resin (III) was prepared in the same manner as in Example 1 except that a monomer mixture of 75% of ST and 25% of acrylonitrile was used instead of MMA. The polymerization conversion was 96%. The obtained rubber-modified resin particles had an average particle size of 160 nm and a solvent-insoluble matter content of 88%.

The Izod impact test was made in the same manner as in Example 1 except that the rubber-modified resin (III) was used instead of the rubber-modified resin (I). The results are shown in Table 1.

COMPARATIVE EXAMPLE 1

Polymerization of a vinyl monomer in the presence of rubber particles was carried out without coagglomerating the rubber particles to enhance the particle size.

That is to say, a powder of rubber-modified resin (I') was prepared in the same manner as in Example 1 except that sodium sulfate was not added. The polymerization conversion was 99%. The obtained rubber-modified resin particles had an average particle size of 85 nm and a solvent-insoluble matter content of 89%.

The Izod impact test was made in the same manner as in Example 1 except that the rubber-modified resin (I') was used instead of the rubber-modified resin (I). The results are shown in Table 1.

COMPARATIVE EXAMPLE 2

Polymerization of a vinyl monomer in the presence of rubber particles was carried out in the same manner as in Example 1 except that a composite rubber previously obtained by particle size enhancing coagglomeration was used instead of adding an electrolyte during the polymerization.

That is to say, a flask was charged with 240 parts of pure water, 11.9 parts (solid basis) of silicone rubber latex (A-1) and 73.1 parts (solid basis) of acrylic rubber latex (B-1) to give a mixed rubber latex. To the mixed rubber latex were added 0.7 part of acetic acid and then 0.5 part of NaOH at 70° C. in a nitrogen stream to give a coagglomerated rubber of enhanced particle size (composite rubber). The average particle size of the composite rubber was 175 nm.

To the obtained composite rubber latex was added dropwise 15 parts of MMA over 1 hour. After the completion of the addition, the reaction mixture was further stirred for 1 hour to complete the polymerization, thus giving graft copolymer (II') particles. The polymerization conversion was 99%. The obtained graft copolymer particles had an average particle size of 185 nm and a solvent-insoluble matter content of 90%.

The Izod impact test was made in the same manner as in Example 1 except that the graft copolymer (II') was used instead of the rubber-modified resin (I). The results are shown in Table 1.

TABLE 1

|  |  | Ex.1 | Ex.2 | Ex.3 | Com. Ex.1 | Com. Ex.2 |
|---|---|---|---|---|---|---|
| Izod impact strength (kJ/m$^2$) | 23° C. | 65 | 55 | 35 | 13 | 20 |
|  | 0° C. | 11 | 10 | 9 | 7 | 8 |

From the results shown in Table 1, it would be understood that a high effect of improving impact resistance is exhibited by the use of the rubber-modified resin of the present invention as an impact modifier for vinyl chloride resins.

EXAMPLE 4

Into 100 parts of a polycarbonate resin comprising 2,2-bis(4-hydroxyphenyl)propane as a bisphenol component and having a weight average molecular weight of 23,000 were incorporated 3 parts of the rubber-modified resin (I) obtained in Example 1, 0.3 part of a phenolic stabilizer (TOPANOL CA made by ZENECA) and 0.3 part of a phosphorus stabilizer (ADEKASTAB PEP36 made by Asahi Denka Kogyo K. K). The mixture was melt-kneaded by a 40 mm single screw extruder (model HW-40-28 made by Tabata Kikai Kabushiki Kaisha) to give pellets. The obtained pellets were dried at 110° C. for more than 5 hours and molded by an injection molding machine (model FAS100B made by Kabushiki Kaisha FANUC) at a cylinder temperature of 290° C. to give ¼ inch Izod impact test specimens. The specimens were subjected to the Izod impact test. The results are shown in Table 2.

COMPARATIVE EXAMPLE 3

The Izod impact test was made in the same manner as in Example 4 except that the graft copolymer (II') obtained in Comparative Example 2 was used instead of the rubber-modified resin (I). The results are shown in Table 2.

TABLE 2

|  | Example 4 | Com. Ex. 3 |
|---|---|---|
| Izod impact strength (kJ/m2) at 23° C. | 68 | 59 |

From the results shown in Table 2, it would be understood that in case of using the rubber-modified resin of the present invention as an impact modifier for polycarbonate resins, it exhibits a higher effect of improving impact resistance as compared with a graft copolymer containing a composite rubber composed of a silicone rubber and an acrylic rubber.

EXAMPLES 5 AND 6

A latex of rubber-modified resin (IV) was prepared in the same manner as in Example 1 except that in the preparation of rubber-modified resin (I) of Example 1, there were changed the amount of silicone rubber latex (A-1) to 18 parts (solid basis), the amount of acrylic rubber latex (B-1) to 72 parts (solid basis), the amount of MMA to 10 parts and the amount of sodium sulfate to 1.5 parts. The polymerization conversion of MMA was 99%. The obtained rubber-modified resin particles had an average particle size of 190 nm and a solvent-insoluble matter content of 86%. The obtained latex was subjected to a coagulation treatment in the same manner as in Example 1 to give a powder of rubber-modified resin (IV).

A composition was prepared using the obtained rubber-modified resin (IV) according to the recipe shown in Table 3, and was melt-kneaded by a twin screw extruder (model TEX44S made by The Japan Steel Works, Ltd.) to give pellets. The obtained pellets were dried at 110° C. for more than 5 hours and molded by an injection molding machine (model FAS100B made by Kabushiki Kaisha FANUC) at a cylinder temperature of 280° C. to give ⅛ inch test specimens for Izod impact test and 1/16 inch test specimens for flame resistance evaluation. Using these specimens, the Izod impact test and flame resistance evaluation were made. The results are shown in Table 3.

COMPARATIVE EXAMPLES 4 and 5

In Comparative Example 4, the procedure of Example 5 was repeated except that the rubber-modified resin (I) was replaced with a silicone flame retardant (KR-219 made by Shin-Etsu Chemical Co., Ltd.) and the flame retardant KR-219 was used in an amount of 8 parts.

In Comparative Example 5, the procedure of Example 5 was repeated except that the rubber-modified resin (I) was not used without the replacement thereof with the silicone flame retardant.

The results of the Izod impact test and flame resistance evaluation are shown in Table 3.

COMPARATIVE EXAMPLES 6 and 7

In Comparative Example 6, the procedure of Example 6 was repeated except that the rubber-modified resin (I) was not used.

In Comparative Example 7, the procedure of Example 6 was repeated except that the rubber-modified resin (I) and the phosphorus-based flame retardant triphenyl phosphate were not used.

The results of the Izod impact test and flame resistance evaluation are shown in Table 3.

TABLE 3

|  | Ex.5 | Ex.6 | Com. Ex.4 | Com. Ex.5 | Com. Ex.6 | Com. Ex.7 |
|---|---|---|---|---|---|---|
| Thermoplastic resin |  |  |  |  |  |  |
| PC | 90 | 70 | 90 | 90 | 70 | 70 |
| PET | 10 | 30 | 10 | 10 | 30 | 30 |
| Impact modifier Rubber-modified resin (IV) | 2 | 3.5 | 0 | 0 | 0 | 0 |
| Flame retardant |  |  |  |  |  |  |
| KR-219 | 6 | 0 | 8 | 0 | 0 | 0 |
| Triphenyl phosphate | 0 | 5 | 0 | 0 | 5 | 0 |
| Antidropping agent PTFE | 0.5 | 0.3 | 0.5 | 0.5 | 0.3 | 0.3 |
| Stabilizer |  |  |  |  |  |  |
| AO-60 | 0.1 | 0.2 | 0.1 | 0.1 | 0.2 | 0.2 |
| PEP-36 | 0.1 | 0.3 | 0.1 | 0.1 | 0.3 | 0.3 |
| Izod impact strength at 23° C. (kJ/m$^2$) | 80 | 35 | 8 | 35 | 9 | 10 |

TABLE 3-continued

|  | Ex.5 | Ex.6 | Com. Ex.4 | Com. Ex.5 | Com. Ex.6 | Com. Ex.7 |
|---|---|---|---|---|---|---|
| UL94 V | V-1 | V-0 | V-1 | below standard | V-0 | below standard |

The ingredients shown in Table 3 are as follows:
PC: Polycarbonate resin comprising 2,2-bis(4-hydroxyphenyl)propane as a bisphenol component and having a weight average molecular weight of 23,000
PET: Polyethylene terephthalate resin having a logarithmic viscosity of 0.75
KR-219: Silicone flame retardant KR-219 made by Shin-Etsu Chemical Co., Ltd.
PTFE: Polytetrafluoroethylene
AO-60: Phenolic stabilizer (ADEKASTAB PEP36 made by Asahi Denka Kogyo K.K)
PEP36: Phosphorus stabilizer (ADEKASTAB PEP36 made by Asahi Denka Kogyo K.K)

From the results shown in Table 3, it is found that the rubber-modified resin of the present invention can improve the impact resistance of a polycarbonate/polyethylne terephthalate blend flame-retarded by a silicone flame retardant or a phosphorus flame retardant while maintaining the flame resistance of the blend.

EXAMPLE 7

Into 70 parts of a polycarbonate resin (LEXANE 121 made by GE Plastics Japan Ltd.) and 30 parts of an ABS resin (SUNTAC AT05 made by Mitsui Chemicals, Inc.) were incorporated 5 parts of the rubber-modified resin (I) obtained in Example 1, 0.3 part of a phenolic stabilizer (TOPANOL CA made by ZENECA) and 0.3 part of a phosphorus stabilizer (ADEKASTAB PEP36 made by Asahi Denka Kogyo K. K). The mixture was melt-kneaded by a 40 mm single screw extruder (model HW-40-28 made by Tabata Kikai Kabushiki Kaisha) to give pellets. The obtained pellets were dried at 110° C. for more than 5 hours and molded by an injection molding machine (model FAS100B made by Kabushiki Kaisha FANUC) at a cylinder temperature of 260° C. to give ¼ inch Izod impact test specimens. The specimens were subjected to the Izod impact test. The results are shown in Table 4.

COMPARATIVE EXAMPLE 8

The procedure of Example 7 was repeated except that the rubber-modified resin (I) was not used. The results of Izod impact test are shown in Table 4.

TABLE 4

|  |  | Example 7 | Com. Ex. 8 |
|---|---|---|---|
| Izod impact strength (kJ/m$^2$) | 23° C. | 49 | 45 |
|  | −30° C. | 16 | 10 |

From the results shown in Table 4, it is found that the rubber-modified resin of the present invention also exhibits an effect of improving impact resistance on a polycarbonate/ABS resin blend.

INDUSTRIAL APPLICABILITY

According to the present invention, rubber-modified resins having a remarkably improved impact resistance-imparting effect can be obtained by conducting polymerization of vinyl monomers in the presence of a silicone rubber latex and an acrylic rubber latex, during which polymer particles are coagglomerated to enhance the particle size. The rubber-modified resins are applicable to various thermoplastic resins as impact modifier, and thermoplastic resin compositions comprising the rubber-modified resin and a thermoplastic resin have excellent impact resistance.

What is claimed is:

1. A rubber-modified resin product, comprising:

a) silicone rubber particles, each silicone rubber particle having a vinyl monomer graft polymerized thereon;

b) acrylic rubber particles, each acrylic rubber particle having a vinyl monomer graft polymerized thereon;

said graft polymerized silicone rubber particles and said graft polymerized acrylic rubber particles being coagglomerated and having a vinyl monomer polymerized onto said coagglomeration in a polymerization system wherein polymerization conversion of the vinyl monomer which is polymerized onto said coagglomeration is carried out by adding an electrolyte to the polymerization system when the conversion has reached 10% to 70% by weight.

2. The rubber-modified resin of claim 1, wherein the amount of silicone is from 1 to 90% by weight based on 100% by weight of the whole rubber component.

3. The rubber-modified resin of claim 1 or 2, wherein 2 to 60 parts by weight of the vinyl monomer is polymerized in the presence of 40 to 98 parts by weight (solid basis) of the whole rubber latex, the total thereof being 100 parts by weight.

4. The rubber-modified resin of claim 1 or 2, wherein said vinyl monomer is at least one member selected from the group consisting of aromatic vinyl monomers, vinyl cyanide monomers, halogenated vinyl monomers, (meth)acrylic acid and (meth)acrylic esters.

5. A thermoplastic resin composition comprising 100 parts by weight of a thermoplastic resin and 0.1 to 150 parts by weight of the rubber-modified resin of claim 1.

6. The composition of claim 5, wherein the vinyl monomer used in the preparation of said rubber-modified resin is at least one member selected from the group consisting of aromatic vinyl monomers, vinyl cyanide monomers, halogenated vinyl monomers, (meth)acrylic acid end (meth)acrylic esters.

7. The composition of claim 5 or 6, wherein said thermoplastic resin is at least one member selected from the group consisting of polyvinyl chloride, chlorinated polyvinyl chloride, polystyrene, styrene-acrylonitrile copolymer, styrene-acrylonitrile-N-phenylmateimide copolymer, α-methylstyrene-acrylonitrile copolymer, polymethyl, methacrylate, methyl methacrylate-styrene copolymer, polycarbonate, polyamide, polyester, HIPS resin, ABS resin, AAS resin, AES resin and polyphenylene ether.

8. The rubber-modified resin of claim 1, wherein said coagglomerating is carried out by added an electrolyte to the polymerization system when the polymerization conversion of said vinyl monomer has reached 10 to 50% by weight.

* * * * *

UNITED STATES PATENT AND TRADEMARK OFFICE
CERTIFICATE OF CORRECTION

PATENT NO. : 6,822,045 B2  
APPLICATION NO. : 10/168741  
DATED : November 23, 2004  
INVENTOR(S) : Nobuo Miyatake et al.

Page 1 of 1

It is certified that error appears in the above-identified patent and that said Letters Patent is hereby corrected as shown below:

On the Title Page

In column 1, item (75), delete "Takasago" and substitute --Takasago-shi-- in its place (both occurrences).

In column 1, item (73), delete "Osaka" and substitute --Osaka-shi-- in its place.

In the Claims

Column 22, in claim 7, line 52, before "copolymer," delete "phenylmateimide" and substitute --phenylmaleimide-- in its place.

Signed and Sealed this

Ninth Day of October, 2007

JON W. DUDAS  
*Director of the United States Patent and Trademark Office*